United States Patent [19]

Empey et al.

[11] 3,919,189
[45] Nov. 11, 1975

[54] DECREASING BACTERIAL CONTAMINATION OF XANTHAN GUM WITH PROPYLENE OXIDE

[75] Inventors: Richard A. Empey; David J. Pettitt, both of San Diego, Calif.

[73] Assignee: Kelco Company, San Diego, Calif.

[22] Filed: Apr. 9, 1973

[21] Appl. No.: 348,899

[52] U.S. Cl. .................................... 260/209 R
[51] Int. Cl.$^2$ .................................... C08B 37/00
[58] Field of Search ........................... 260/209 R

[56] References Cited
UNITED STATES PATENTS

| | | |
|---|---|---|
| 3,300,473 | 1/1967 | Christoffel et al. ............ 260/209 R |
| 3,326,890 | 6/1967 | Engelskirchen et al. ........ 260/209 R |
| 3,350,386 | 10/1967 | Engelskirchen et al. ........ 260/209 R |

Primary Examiner—Johnnie R. Brown
Attorney, Agent, or Firm—Hesna J. Pfeiffer; J. Jerome Behan

[57] ABSTRACT

Intimate intermingling, as in a tumble reactor, of particulate xanthan gum with propylene oxide as essentially the only gas present, at about 90°–125° F., for not more than 4 hours, can produce a xanthan gum substantially free of bacterial contaminants; the propylene oxide is removed to afford a residual propylene oxide content of not more than 300 ppm in the product xanthan gum.

2 Claims, No Drawings

DECREASING BACTERIAL CONTAMINATION OF XANTHAN GUM WITH PROPYLENE OXIDE

BACKGROUND OF THE INVENTION

1. The Field of the Invention

This invention relates to decreasing the bacterial contamination of xanthan gum, by treatment thereof with propylene oxide gas. Particularly, the invention relates to the production of a substantially aseptic xanthan gum, without any significant change in gum property as measured by viscosity and pH of a water solution.

2. The Background of the Prior Art

The invention is concerned with the total bacteria count on xanthan gum, measured as bacteria/gm. The total bacteria count on xanthan gum is determined by a standardized procedure. W. G. Walter, editor, "Standard Methods for the Examination of Dairy Products," 11th edition, American Public Health Association, 1960.

For many purposes, vegetable gums and biosynthetic gums must have a low level of bacterial contamination, desirably a substantially aseptic condition. For many food and pharmaceutical applications, the total bacteria count per gram must be less than 10,000 and it is desirable to reduce the number of bacteria to an even lower level such as 250 per gram.

The United States Food and Drug Administration has placed for the heating of such gum in a propylene oxide atmosphere, an upper temperature limit of 125° F. and a maximum time of heating of not more than 4 hours.

Propylene oxide gas has been used in "sterilization" of gums. The FDA has placed an upper limit (level) on the residual propylene oxide treated gum at not more than 300 weight parts of said oxide per million weight parts of gum (hereinafter referred to as "ppm").

Xanthan gum, as used herein, refers to the biosynthetic polysaccharide elaborated by various species of the Xanthomonas genus of bacteria, wherein said bacteria operate on a substrate of glucose or equivalent sugar. This gum is also referred to in the art as "Xanthomonas hydrophilic colloid," or as "Xanthomonas heteropolysaccharide" or as "Xanthomonas gum". Gum from the *Xanthomonas campestris* species is available from Kelco Company under the tradename "KEL-ZAN" or "KELTROL".

Xanthan gum preparation is described in numerous publications and patents. Four of these are cited and incorporated herein: U.S. Pat. Nos. 3,557,016; 3,481,889, 3,438,915 and 3,305,016.

Xanthan gum has previously been sterilized by a commonly used static method. In this method the gum is placed in 100 lb. drums and held at 75°–85° F. for 24 hours. The drums are then placed in a retort having a volume of from 200 to 500 cubic feet and the retort is preheated to 125° F. for a minimum of 1 hour. The heating is then discontinued and the retort is evacuated to about 29 inches of mercury. Propylene oxide (generally 1.0–2.5 oz./cu ft.) is then introduced over a period of from 15 to 30 minutes; the treatment time is 4 hours maximum. The retort is evacuated. Filtered air is allowed to fill the retort; the retort is again evacuated; then again filled with air to one atmosphere.

Another static process (referred to as a pulsation process), as described in U.S. Pat. No. 3,206,275, is generally more effective than the process described above. In this U.S. Pat. No. 3,206,275 process, after charging with propylene oxide, the retort is evacuated and recharged with the same gas mixture several times.

Xanthan Gum Treated by the Aforesaid Static Processes

Treatment of xanthan gum by the "static" processes reduced the bacteria count on the average by 54 percent. The sterilization efficiency is limited by the ability of the propylene oxide to penetrate the bulk packed gum after "removing the air" by evacuation. Bacteriological tests of samples removed from the middle of the drums of treated gum consistently gave higher counts than samples taken from the top, thus, indicating that penetration of propylene oxide was not complete.

Objects of the Invention

An object of the invention is a more effective sterilization process for xanthan gum.

Another object of the invention is a more economical sterilization process for xanthan gum.

A particular object of the invention is a sterilization process for xanthan gum which does not significantly change the gum as measured by the properties; viscosity and pH of an aqueous solution of the gum.

Summary of the Invention

The process of this invention for decreasing the amount of contamination (sterilization) of a bacteria in the vegetative or spore form on the gum consists essentially of: intimately intermingling xanthan gum, including said bacterial contaminants, in particulate form, and propylene oxide gas, as essentially the only gas present in the intermingling zone. The intermingling is carried out at a temperature between about 90° F. and a maximum of 125° F., for a time, not in excess of 4 hours, such that the amount of bacterial contamination is substantially decreased. The product (oxide treated) gum is then treated to a propylene oxide residue of not more than 300 ppm. Usually the contaminated xanthan gum charge to the process has a bacteria contamination in excess of 10,000 bacteria/gm. and the product gum has a bacterial contamination of not more than 10,000 bacteria/gm. as measured by the standard method for total bacteria count set out before. However, the product gum may have a much lower contamination count and may after controlled condition processing have a contamination count of a substantially aseptic gum, such as a count of 250.

Particularly in a closed batch reactor, the propylene oxide is present (used) in an amount of not more than about 6 ounces per cubic foot based on the reactor volume. Usually the propylene oxide is present in the intermingling zone in an amount of about 0.4–6.0 ounces per cubic foot, preferably 0.9–4.0 ounces per cubic foot.

Operating with the 0.4–6 ounces per cubic foot oxide usage, at a temperature of about 95°–115° F. for not more than four hours, it is possible to obtain a product xanthan gum where at least about 75% of the bacteria have been sterilized, as indicated by the total bacteria count. By controlling the 95°–115° F. temperature and time between 2 and 4 hours, it is possible to afford a bacterial contamination decrease of at least about 85%.

In a specific embodiment of the invention, xanthan gum containing about 24,000 bacteria/gm. is tumble intermingled with about 1.0 ounce per cubic foot of propylene oxide gas, based on the reactor volume, as essentially the only gas present, at about 105° F. for about 3 hours, and the propylene oxide gas is thereafter removed to obtain a sterilized xanthan gum product having about 1,800 bacteria/gm and about 180 ppm of residual propylene oxide.

The "intimate intermingling" of this invention refers to a dynamic procedure which continually exposes gum surfaces to the propylene oxide gas. Such a dynamic situation can be obtained in batch closed reactors which tumble the particulate solid inside the reactor providing a cascade contact of the solids and the propylene oxide — these are particularly suitable when the oxide usage (more correctly, 'presence' as very little oxide is consumed and that by reaction with moisture content of the gum) is desired to be kept in the low usages set out above.

Another type of suitable reactor is a vertical conduit provided with baffling to cause the solids to cascade through the upflowing propylene oxide. Still another reactor is a fluid bed vessel with the particulate gum being fluidized by the upflowing propylene oxide gas.

The propylene oxide may be removed by any physical procedure which does not contaminate the gum, such as, evacuation of the reactor; stripping with aseptic inert gas such as nitrogen.

DESCRIPTION OF EMBODIMENTS AND EXAMPLES

Laboratory Tumbler

The laboratory tumbler consisted of a 5 liter round bottom reaction flask which was indented. Connected to this flask by means of a reaction flask clamp was a tube of 370 mm. in length with the narrow part having an i.d. of 20 mm. and with a male 35/20 standard ball and socket piece attached to the narrow end. A Y-shaped glass tubing having a female 35/20 standard ball and socket piece on one leg and a silicon rubber septem on a second leg was attached to the tube by means of a clamp. The third leg of the Y-tube was connected to an aspirator. Located 120 mm. from the large end of the tube was a bearing. A second bearing was located 270 mm. from the large end and a pulley was located 320 mm. from the large end. The entire apparatus fitted into a stand such that the two bearings were held in clamps and the apparatus held at a 30° angle below the horizontal. The Y-tube was held fixed by a clamp, thus allowing the tube and reaction flask to rotate at the ball and socket joint when the pulley was turned by a belt connected to a motor.

Laboratory Sterilization 950 gm. of dried xanthan gum was milled to reduce the particle size to less than 500 microns and was placed in the tumbler and the tumbler and contents were rotated at 105° F. for 15 minutes while the tumbler was being evacuated. At the end of this period the vacuum was discontinued and 19 gm. of propylene oxide were introduced into the evacuated tumbler. The tumbler and contents were allowed to rotate 3 hours at 105° F. after which time the tumbler was again evacuated for 15 minutes. The treated gum was aseptically removed from the reactor and packaged. The 1 percent viscosity (1 wt. % gum in distilled water) and pH of the 1 weight percent solution was determined for the gum before and after treatment.

Plant Tumbler

The plant tumbler was a double cone blender having a volume of 58 cu. ft., conical at both ends, and diverging from the axis about which the tumbler rotates. The tumbler was jacketed and cooling water or steam or a combination of both could be circulated through the jacket. The tumbler was rated at 15 lb. pressure or full vacuum. A propylene oxide addition line passed through a steam line to vaporize the propylene oxide, if necessary, and then through the axis into the tumbler. Material was introduced and removed through parts located at either of the conical ends and a vacuum line and pressure gauge were also located at one end.

Plant Sterilization 1,500 lbs. of xanthan gum having a particle size less than 500 microns were placed in the tumbler and the tumbler and contents were heated to 105° F. while simultaneously being evacuated. After 1 hour, evacuation was discontinued and 8 lbs. of propylene oxide were introduced. The treatment was continued for 3 hours at 105° F. after which time heating was discontinued and vacuum was again initiated and continued for 1 hour. The gum was removed aseptically from the tumbler and immediately packaged.

Data from laboratory and plant tests are set out in Table I.

The initial laboratory experiments were carried out using 3.8 ounces per cubic foot propylene oxide for 3 hours at 105° F. Subsequent experiments showed that 1.0 ounce per cubic foot oxide at 105° F. and 3 hours treatment time gave the same results. Increasing the treatment time to 4 hours did not increase the percent bacteria kill sufficiently to justify the additional hour.

In the plant experiments treatment was 3 hours followed by another evacuation period of one hour.

Analyses indicate that xanthan gum treated in the laboratory tumbler contained less than 150 ppm residual propylene oxide while xanthan gum treated in the plant contained less than the FDA maximum. In order to reduce the residual oxide level to below the FDA allowance, in plant experiments, it was necessary to alternately evacuate and tumble during the final evacuation period.

TABLE 1

| Example Number | | Initial Analysis | | | | | | Analysis After Treatment | | | | |
|---|---|---|---|---|---|---|---|---|---|---|---|---|
| | | 1% Vis. (cps) | pH | Bacteria/ gm. | PO* Concentration oz/cu ft | Time (Hrs.) | Temp. (°F) | 1% Vis. (cps.) | pH | Bacteria/ gm. | Residual PO (ppm)% | Bacteria Count decrease |
| (Lab.) | 1 | 680 | 7.4 | 19,750 | 3.8 | 3 | 105 | 700 | 7.3 | 1,600 | 96 | 92 |
| (Lab.) | 2 | 680 | 7.4 | 19,750 | 1.9 | 3 | 105 | 690 | 7.4 | 1,560 | 125 | 92 |
| (Lab.) | 3 | 660 | 7.5 | 1,900 | 1.0 | 3 | 105 | 666 | 7.5 | 250 | 105 | 87 |
| (Lab.) | 4 | 660 | 7.5 | 1,900 | 1.0 | 4 | 105 | 726 | 7.1 | 100 | 50 | 95 |
| (Plant) | 5 | 770 | 7.5 | 10,750 | 1.02 | 3 | 105 | 840 | 7.3 | 2,650 | 135 | 75 |
| (Plant) | 6 | 700 | 7.1 | 23,850 | 1.02 | 3 | 105 | 774 | 6.7 | 1,800 | 180 | 92 |

TABLE 1-continued

| Example Number | Initial Analysis | | | PO* Concentration oz/cu ft | Time (Hrs.) | Temp. (°F) | Analysis After Treatment | | | Residual PO (ppm)% | Bacteria Count decrease |
| | 1% Vis. (cps) | pH | Bacteria/ gm. | | | | 1% Vis. (cps.) | pH | Bacteria/ gm. | | |
| --- | --- | --- | --- | --- | --- | --- | --- | --- | --- | --- | --- |
| (Plant) 7 | 700 | 7.2 | 13,600 | 1.02 | 3 | 105 | 700 | 7.2 | 900 | 240 | 93 |

*Propylene Oxide

Thus having described the invention, what is claimed is:

1. A process for sterilizing particulate xanthan gum containing about 24,000 bacteria/gm. wherein said gum charge is tumble-intermingled with about 1.0 ounce per cubic foot of propylene oxide gas, based on the reactor volume, as essentially the only gas present, at about 105° F. for about 3 hours, and the propylene oxide gas is thereafter removed to obtain a sterilized xanthan gum product having about 1,800 bacteria/gm. and about 180 ppm of residual propylene oxide.

2. A process for the purification of xanthan gum containing bacterial contamination which comprises intermingling the particulate impure xanthan gum with gaseous propylene oxide, the latter at a density of 0.4 - 6 ounces per cubic feet;
at a temperature of about 95°–115°F. for not more than 4 hours;
and recovering the xanthan gum having a bacterial level which is 75% reduced below the original level of contamination, and a propylene oxide residue of no more than 300 ppm.

* * * * *